Aug. 23, 1932.  A. W. SEYFRIED  1,873,343

MOTOR MOUNTING

Filed June 25, 1927

Arthur W. Seyfried
Inventor

By Smith and Freeman
Attorneys

Patented Aug. 23, 1932

1,873,343

UNITED STATES PATENT OFFICE

ARTHUR W. SEYFRIED, OF CLEVELAND HEIGHTS, OHIO, ASSIGNOR TO THE APEX ELECTRICAL MANUFACTURING COMPANY, OF CLEVELAND, OHIO, A CORPORATION OF OHIO

MOTOR MOUNTING

Application filed June 25, 1927. Serial No. 201,493.

This invention relates to electric motor mountings and has for its object the provision of a noise-proof mounting which shall at the same time support the motor firmly in its position. For purposes of illustration I have chosen a support for a ventilating motor, which is in many respects a severe test, and the improvements herein described exhibit certain desirable features peculiarly applicable to this use, although many of the same are susceptible of a much broader utility.

Figure 1:
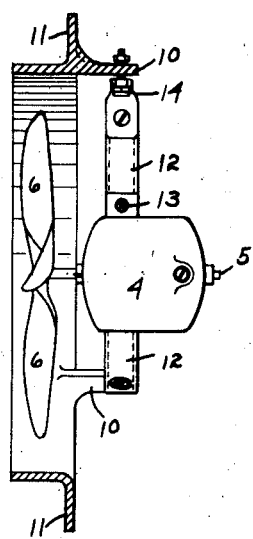
Figure 2:
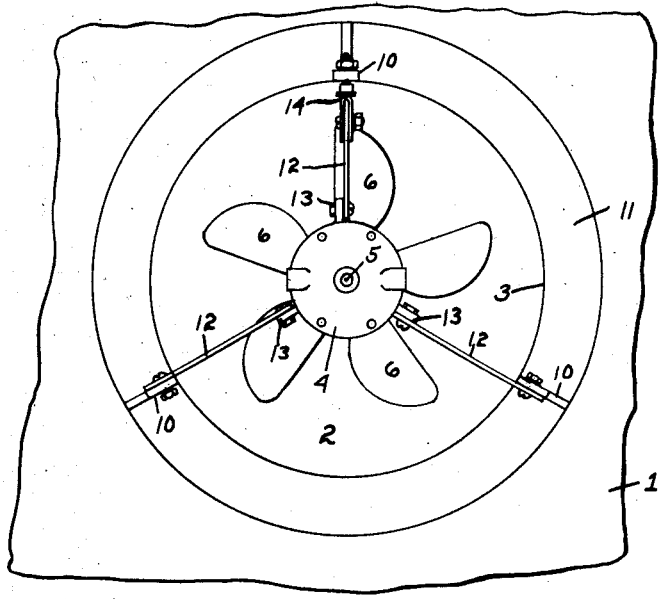
Figure 3:
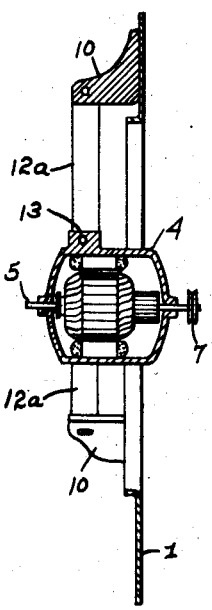
Figure 4:
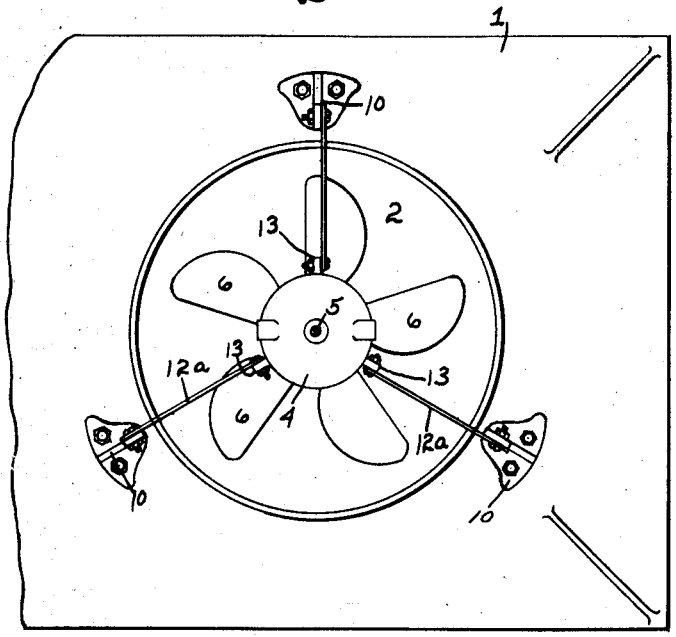

In the drawing accompanying and forming a part of this application I have shown certain physical forms in which my inventive idea is embodied. Figs. 1 and 2 are respectively a vertical section and a rear elevation of a motor and mounting containing my improvements; and Figs. 3 and 4 are similar views showing a slight modification.

The rotating element of an electric motor is rotated by virtue of a continuous series of intermittent, circumferential pulsations, and under certain conditions the torsional vibration thus tended to be produced, is communicated to surrounding objects with the production of objectionable noise. This is particularly likely to occur when the motor is mounted in or upon any flat diaphragm or other resonant body.

This is a matter of particular importance in connection with domestic electric appliances, an example of which is the kitchen ventilator herein illustrated, wherein 1 denotes a flat supporting element generally of wood or of steel mounted in a frame, such as that of a window and having an opening 2 in which is supported a suitable frame 3, carrying an electric motor 4 whose armature or rotor shaft is shown at 5. In the case of a ventilator, a suitable fan having blades 6, is secured to this shaft and the frame is supported in such wise as to locate said fan parallel to, and in or near to the plane of said opening. Of course other devices than a fan can be operated by said shaft, such as a pulley 7.

The particular support here illustrated comprises a plurality of rigid arms 10—10 more or less symmetrically disposed as regards the motor and connected to the frame by elements 12 which are yieldable elastically in a circumferential direction about the armature shaft, while being relatively non-yieldable radially. These arms 10 can be made in any desired manner, here being illustrated with an annular stiffening member 11 secured to the member 1 about the margin of the aperture 2 while in Figs. 3 and 4 they are fastened directly to the face of the plate. The frame may either constitute the part which is technically known as the "frame" of the motor or any other and auxiliary frame to which the same is secured. The yielding elements illustrated in Fig. 1 consist of flat strips 12—12 of leather or canvas, or like material secured tightly at their inner ends to bosses 13—13 carried by the motor 4.

The outer ends of these straps are fastened to the anchorages or arms 10, a turnbuckle 14 being used in at least one of them to take up slack. In the form shown in Figs. 3 and 4 the strips 12ª are made of spring steel, brass, or fibre, the last named material being preferable as being insulating.

According to my invention the motor is held concentric to a given position, but without preventing torsional vibration thereof about that position, communication of such vibrations to the supporting member being prevented. It will be understood that many changes in detail can be made within the scope of my inventive idea and I do not limit myself to the forms and designs here shown except as the same are specifically recited in my various claims.

Having thus described my invention what I claim is:

1. The combination with an electric motor comprising a frame and a rotating element journaled therein upon a horizontal axis, of a noise-proof support comprising parts spaced from said motor, and a plurality of connecting elements between said frame and support and constituting the sole means for sustaining the weight of said frame and rotating element, said elements consisting essentially of thin, flat, elongated strips of laterally yieldable and longitudinally inextensible nature arranged substantially radially relative to the armature axis and the planes defined thereby parallel to such axis, said elements being spaced substantially equidistantly around said axis the portions of said strips which are nearest to said motor being secured rigidly to said frame and the portions of said strips furthest from said motor being secured rigidly to said support whereby said frame is rendered elastically yieldable circumferentially of the armature axis and substantially non-yieldable radially of such axis.

2. The combination with an electric motor having its axis horizontal of a rigid support therefor spaced from the motor frame, and flat, elongated, strap-like elements arranged with their major dimensions substantially radial to the motor axis and their planes substantially parallel to said axis, said elements having radially spaced portions secured rigidly to said support and motor-frame respectively and spaced substantially equidistantly about said axis whereby the axis of the motor armature is maintained in a fixed position by the longitudinal inextensibility of said elements while vibration of said frame circumferentially of said axis is permitted by the lateral elasticity of said elements whereby said elements are rendered resiliently yieldable circumferentially of the motor-armature and relatively non-yieldable radially thereof, said elements constituting the sole means for sustaining the weight of said motor.

3. The combination with an electric motor having its axis horizontal, of means for holding the same concentric to its armature axis while permitting it to vibrate circumferentially about such axis, such means comprising members of electrically non-conducting material which are resiliently yieldable in a direction which is circumferential of the motor armature, and substantially unyieldable in other directions.

4. In a ventilating device, a flat faced member having an aperture therein, a plurality of anchorages carried by said member about said aperture, a motor located in said aperture, the frame of said motor having bosses, and non-extensible, laterally yieldable elements of a material which is not a conductor of sound waves secured between said anchorages and bosses and holding said motor in said aperture.

5. In a ventilating device, a flat faced member having an aperture therein, a plurality of anchorages carried by said member about said aperture, a motor located in said aperture, and a plurality of flat elongated strips of non-extensible, laterally yielding material which is non-conductive to sound waves having their inner ends rigidly fastened to said motor and their outer ends rigidly fastened to said anchorages.

In testimony whereof I hereunto affix my signature.

ARTHUR W. SEYFRIED.